United States Patent [19]
Zhang

[11] Patent Number: 5,878,848
[45] Date of Patent: Mar. 9, 1999

[54] VENTILATED BRAKE ROTOR

[75] Inventor: Jian Jun Zhang, Troy, Mich.

[73] Assignee: General Motors Corporation, Detroit, Mich.

[21] Appl. No.: 898,420

[22] Filed: Jul. 22, 1997

[51] Int. Cl.$^6$ .................................................. F16D 65/12
[52] U.S. Cl. .............................. 188/218 XL; 188/264 AA
[58] Field of Search ...................... 188/218 XL, 218 R, 188/18 A, 17, 26

[56] References Cited

U.S. PATENT DOCUMENTS

| | | | |
|---|---|---|---|
| 3,043,630 | 7/1962 | Heitzman | 301/6 |
| 3,955,650 | 5/1976 | Ellis | 188/71.1 |
| 4,083,435 | 4/1978 | Gallus et al. | 188/218 XL |
| 4,164,993 | 8/1979 | Kobelt | 188/218 XL |
| 4,638,891 | 1/1987 | Wirth | 188/58 |
| 4,811,822 | 3/1989 | Estaque | 188/264 A |
| 4,865,167 | 9/1989 | Giorgetti et al. | 188/218 XL |
| 5,107,966 | 4/1992 | Metzler et al. | 188/251 M |
| 5,161,652 | 11/1992 | Suzuki | 188/218 XL |
| 5,492,205 | 2/1996 | Zhang | 188/218 XL |

FOREIGN PATENT DOCUMENTS

| | | | |
|---|---|---|---|
| 3740311 | 6/1989 | Germany | 188/218 XL |
| 4323782 | 1/1994 | Germany | 188/218 XL |

*Primary Examiner*—Matthew C. Graham
*Attorney, Agent, or Firm*—Jeffrey A. Sedlar

[57] ABSTRACT

A ventilated brake rotor includes two spaced apart annular disks each having an inner diameter and an outer diameter with a locus radius defined radially between the inner diameter and the outer diameter. A series of alternating longer and shorter vanes is distributed around the rotor between the annular disks defining a series of flow passages between each adjacent pair of vanes. Each vane is defined about a curved line with a curvature that is measured from the locus radius, wherein the curved line's curvature is defined by the incoming air flow angle at the flow passage, and wherein the vane profile varies along the curved line so that a non-uniformly curved profile results that maximizes the flow rate through the flow passage. The vane angle and the vane profile result in minimized incidence, viscous and profile flow losses.

8 Claims, 2 Drawing Sheets

VENTILATED BRAKE ROTOR

TECHNICAL FIELD

This invention relates to ventilated brake rotors as used in a vehicle braking system. More particularly, the invention relates to a ventilated vehicle brake rotor that incorporates a plurality of aerodynamic curved vanes that define efficient flow paths for air cooling purposes.

BACKGROUND OF THE INVENTION

To brake a traveling vehicle to a slower speed or to a stop, a significant amount of energy must be dissipated. A large part of this energy is converted into heat that tends to raise the temperature of the brake rotor. In order to prevent brake overheating and to reduce brake wear which increases with higher temperatures, an adequate provision is typically made for transferring away the heat load generated in vehicle rotors. Often, brake rotors are assembled in applications where external surface heat transfer is sufficient and internal ventilation is not required. Other applications require ventilation air flow through the rotor itself.

Conventional ventilated brake rotors generally include a pair of mutually spaced-apart annular disks that present two opposed external surfaces for engaging brake pads under the clamping operation of a braking actuator. The space between the disks typically includes a number of vanes with flow passages defied between each pair of adjacent vanes that extend between the disks from their inner diameter to their outer diameter. Rotation of the rotor causes the vanes to induce air flow through the flow passages from the inner diameter to the outer diameter of the disks, providing increased convective heat transfer from the rotor.

It is known that brake rotor design plays an important role in brake cooling. U.S. Pat. No. 5,492,205 discloses a rotor utilizing a vane configuration that accommodates the rotor's air flow regime, includes an optimal vane number for a given rotor design resulting in high flow efficiency, and provides a flow passage profile that results in reduced flow restriction and improved cooling air flow. That patent describes a rotor with a straight vane profile.

A brake rotor is generally designed for use within a particular application where surrounding structures impact the rotor's size. Constraints exist on the outer and inner diameters of the rotor's air flow area, and on the total rotor thickness between braking surfaces. Additionally, manufacturing requirements limit the amount that the cross sectional area of the rotor structure can vary. Therefore, the convective heat transfer surface area of the rotor is limited by design constraints that are imposed by the application into which the rotor is integrated.

The vent section of the rotor however, does allow for design flexibility. The vent section, particularly the vane surface, affects the heat transfer rate. Proper design of the vent section can have a favorable impact on the rotor's overall cooling performance. It is generally believed that a curved vane profile is inherently more efficient than a straight vane profile for cooling air flow purposes. However, the use of curved vanes is often undesirable because it entails the use of oppositely curved vanes on opposite sides of the vehicle leading to a proliferation of component part numbers. Therefore, a majority of ventilated brake rotors have straight vanes so that they are adaptable to use on both sides of a vehicle. Accordingly, the development of curved vane rotors has been intermittent, leading to a present need for an aerodynamically efficient design that achieves minimum incident and viscous losses. In order to provide an improved air flow rate for an increased brake rotor cooling effect, a brake rotor with an optimized curved vane configuration is sought that provides a low restriction air flow passage, in a configuration that is adapted to increase flow rate resulting in an enhanced heat transfer mechanism.

SUMMARY OF THE INVENTION

An aspect of the present invention resides in providing a ventilated brake rotor with minimized incidence and viscous losses in the cooling flow paths. Since a brake rotor is a rotating device that induces air flow into the flow passages, the air flow enters the passages with a certain vector direction. If the flow direction is not tangent to the vane surface at the inlet, an angle of attack occurs that disturbs an otherwise smooth flow motion and induces an incidence loss. After air flow enters the passage, an aerodynamically efficient path is necessary to minimize profile drag and viscous loss. Accordingly, minimizing the incidence and viscous losses is critical to maximizing rotor cooling air flow and the cooling rate.

To effectively achieve the preceding and other aspects, the present invention provides a curved vane profile design wherein the effect of air flow attack angle at the passage inlet is minimized to reduce incidence losses, and an efficient flow path with minimum profile drag and viscous loss is provided from the inlet to the outlet of the passage. A characteristic rotor incoming air flow angle is defied by the equation:

$$\theta = \arctan \frac{W_\theta}{W_r}$$

where $\theta$ is the air flow angle at the vane inlet, $W_\theta$ is the tangential component of relative air velocity at the vane inlet, and $W_r$ is the radial component of relative air velocity at the vane inlet.

A characteristic flow rate through the rotor passage is defied by the equation:

$$Q = \int_A \vec{W} \cdot \vec{dA}$$

where Q is the volumetric flow rate through the rotor passage, $\vec{W}$ is the relative velocity at the passage outlet, and $\vec{A}$ is the cross sectional area at the vane passage outlet.

A characteristic vane profile is developed through an iteration process to maximize the volumetric flow rate through the rotor passage. During the iterations, the vane profile is altered by modifying any portion of the vane profile that results in an amplified flow energy loss. Loss is identified by any unpreferable change of the total pressure gradient: $\partial P_o / \partial s$, where $P_o$ is the total pressure, and s is the vane profile direction. The resultant vane profile with an inlet angle $\alpha$ is designed so that air flow at an incoming angle $\theta$ moves through the passage with minimum flow energy loss and maximum flow rate.

In accordance with these characteristics, it has been observed that a curved vane profile is not necessarily more efficient than a straight vane profile for cooling air flow purposes. The present invention has identified that a reasonably curved vane may be as much as 55% less efficient than a straight vane, while an optimally curved vane is much more efficient than a straight vane. More specifically, a curved vane profile may result in flow passages that are aerodynamically inefficient. This can result if the attack angle of the incoming air flow is inadequately considered, or if the configuration does not accommodate the rotor flow regime. Accordingly, encompassed within the present invention is a preferred ventilated brake rotor that includes two spaced apart annular disks each having an inner diameter and an outer diameter with a locus radius defined radially between the inner diameter and the outer diameter. A series of alternating longer and shorter vanes is distributed around the rotor between the annular disks defining a series of flow passages between each adjacent pair of vanes. Each vane is defined about a curved line that may take the form of an arc with a curvature that is measured from the locus radius, wherein the incoming air flow angle at the flow passage is tangent to the curved line's curvature, and wherein the vane profile varies along the curved line so that a non-uniformly curved vane profile results that maximizes the flow rate through the flow passage.

BRIEF DESCRIPTION OF THE DRAWINGS

The present invention will now be described, by way of example, with reference to the accompanying drawings, in which.

DESCRIPTION OF THE PREFERRED EMBODIMENT

Figure 2:
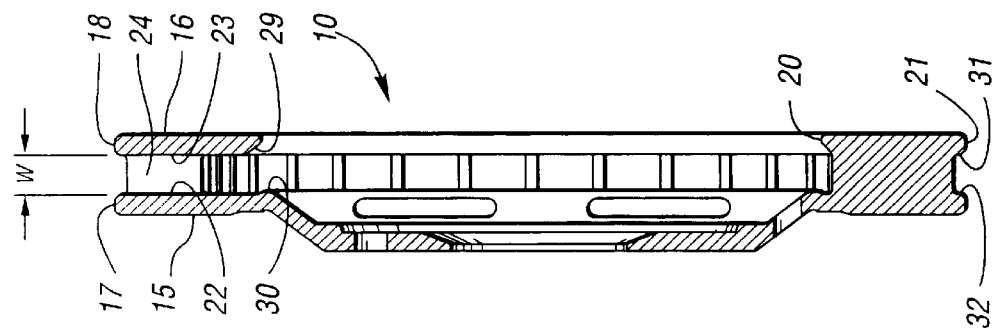
FIG. 2 is a cross sectional illustration taken generally through the plane indicated by the line 2—2 in FIG. 1.
Figure 1:
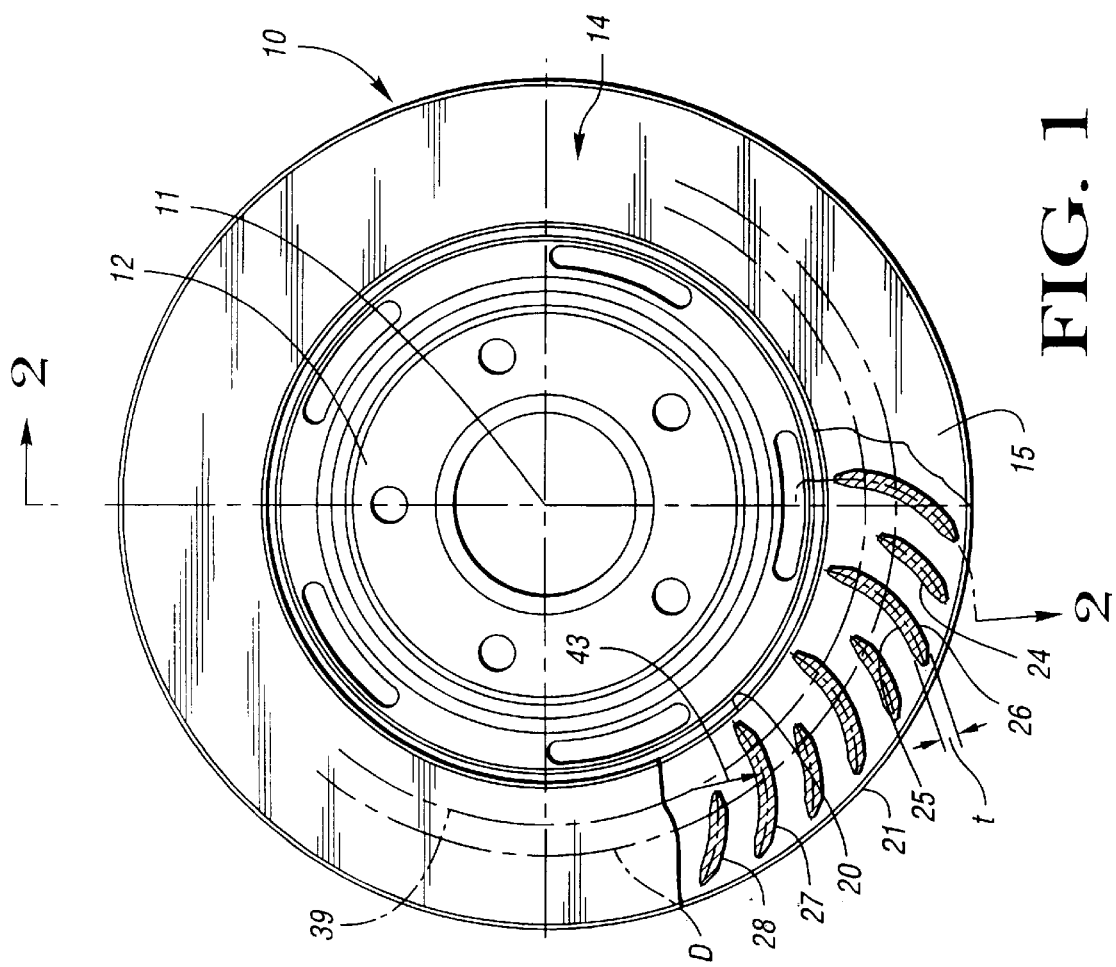
FIG. 1 is a fragmentary, partial sectional illustration of a brake rotor according to the present invention.

Referring to the drawings, illustrated in FIG. 1 is a brake rotor according to the present invention that is designated generally at 10. The brake rotor 10 includes a center hub portion 12 for mounting to a rotatable hub of a vehicle (not illustrated) about an axis of rotation 11, and includes a brake band portion 14 that serves as the locus of application for the braking force of the vehicle. The brake band portion 14 includes two generally parallel planar braking surfaces 15 and 16 as shown in FIG. 2.

Brake rotor 10 is constructed from a one-piece casting of iron, aluminum or other suitable metal as is conventional in the art. However, the construction is equally suited to the well known multiple component type rotor assembly (not illustrated). Referring to FIG. 2 along with FIG. 1, brake band portion 14 includes outboard cheek 17 which exhibits braking surface 15 and an inboard cheek 18 which exhibits braking surface 16. Outboard cheek 17 and inboard cheek 18 are arranged in a mutually spaced apart configuration and each comprises an annular shaped disk having an inner diameter formed by inner perimeter 20 and an outer diameter formed by outer perimeter 21. Brake band portion 14 includes forty curved vanes that extend between the inboard surface 22 of outboard cheek 17 and the outboard surface 23 of inboard cheek 18. The inboard surface 22 and the outboard surface 23 are disposed on the interior of the brake band portion 14 and face each other to define a number of flow passages represented by flow passage 24 therebetween.

In a given application, the inner diameter at inner perimeter 20, the outer diameter at outer perimeter 21, the flow passage width w between surfaces 22 and 23 and the vane thickness t between sides 25 and 26, are established design criteria. Generally, these dimensions cannot be changed in developing the flow regime for the rotor 10 because they are set by external design factors. Therefore, the heart of the rotor configuration design available to optimize air flow characteristics is the vane profile design. For the present embodiment, the design requirement of the ratio of the outer diameter at perimeter 21 to the inner diameter at perimeter 20 is 1.5:1. This illustrates that the flow area changes considerably from the inlet to the outlet of the flow passages 24. To effectively guide air flow through the rotor 10, and to avoid high blockage of the flow passage inlet, a longer vane 27 and shorter vane 28 alternate vane configuration is provided for the curved vane profile. The advantage of this design is that when flow is near the inner diameter at inner perimeter 20, the number of vanes is relatively small. Therefore, flow blockage is minimized and air flow is allowed to pass readily through the inlet flow area into flow passages 24. When flow arrives at approximately the mid-diameter D of the brake band portion 14, the number of vanes is increased to better guide flow through the otherwise increasing vent area towards the outlet.

A major design parameter of the rotor 10 is the number of vanes inside the brake band portion 14. An analysis to determine the optimum number of vanes for a high efficiency rotor is conducted based on fluid mechanics principles. One such principle is that the fluid flow viscous effect, which is associated with friction losses, is dominant for a rotor flow field such as the present, where air velocity is relatively low. Therefore, achieving the least viscous friction loss is a decisive factor in selecting the number of vanes. A significant contributor to a flow passage's viscous effect is the amount of surface area that the flowing fluid contacts. It is well known that for a given area a square has the least perimeter as compared to all other rectangular shapes. Thus, it will result in the lowest viscous effect friction loss. This principle is applied at the mid-diameter D of the rotor 10 to determine the optimum number of vanes for rotor 10. The mathematical expression used to determine the number of vanes is: $N = \pi D/w + t$, where N is the number of vanes, D is the mid-diameter of the rotor brake band portion 14, w is the flow passage width, and t is the vane thickness.

Substituting the known design parameters D, w and t into the equation above results in a preferred vane number of forty for this embodiment. After determining the rotor configuration and the number of vanes included in the rotor, optimum flow passages are designed. The area adjacent the inner diameter at inner perimeter 20, around the flow passage inlet, has only the longer vanes 27 disposed therein. This results in a relatively small number of vanes in this area and the flow blockage is accordingly, small. Therefore, the entering air readily flows into the flow passages 24. Recirculation zones before and after the passage inlet are minimized, which results in improved air flow and higher heat transfer rates from the rotor 10. A factor of brake band portion 14 that favorably impacts on the flow field is that the inboard and outboard shoulders 29 and 30 respectively, exhibit streamlined smoothly curved surfaces that lead to flow passages 24, and inboard and outboard shoulders 31 and 32 respectively, exhibit streamlined smoothly curved surfaces which leave flow passages 24. An additional factor that impacts on the optimal flow condition provided, is the vane tip design. The inlet end vane tips 33 and outlet end vane tips 34 exhibit a streamlined tapered surface which improves the air flow performance. The tips 33 and 34 contribute to a smooth flow through the flow passages of rotor 10 near the inlet and outlet.

The special character of the vane profile of the rotor 10 is critical in minimizing the inlet incidence loss and in minimizing the profile drag and viscous loss. The inlet incidence is directly related to the incoming flow's attack angle, and the profile drag and viscous loss are a function of the vane profile. To determine the optimum vane angle and vane profile a series of iterative computations are required. The amount of pre-swirling of the air flow before it enters the rotor flow passages 24 is an unknown variable at the initiation of the computation. The analysis begins with the assumption that the flow has no pre-swirling at the rotor inlet. This assumption is for the convenience of starting the computation and doesn't effect the outcome. The flow swirling (flow angle), is determined subsequently. It is therefore appropriate to equate $\vec{V}=\vec{V}_r$, so that $\vec{W}=\vec{V}-\vec{\omega}R$, where, $\vec{V}$ is absolute air flow velocity, $\vec{W}$ is velocity relative to the reference frame of the rotating rotor 10, $\vec{\omega}$ is the rotating speed of the rotor 10, R is the radius at the vane inlet, and the subscript r, refers to the radial component. Velocity relative to the reference frame of the rotating rotor 10 is used because the intent is to calculate the air flow angle relative to the rotating rotor. The goal is to determine the air flow angle so that the inlet angle α of the rotor vanes 27, 28 is set equal to the incoming air flow angle θ. The utilized rotational speed of the rotor 10 is 492 revolutions per minute, which is the nominal design speed in the present embodiment and corresponds to a vehicle speed of 35 miles per hour.

Initiating the determination of optimal vane angle and vane profile requires assuming values for both components to start the process. The assumption of these quantities is based on the criterion that the air flow incidence loss is to be minimized. Setting the rotor vane angle α at the inlet equal to the air flow angle θ at the inlet, results in the air entering the passage between the vanes without an incidence angle and thus minimizes incidence loss. The vane profile is initially selected as a curve that extends smoothly between the inlet and the outlet as an extension of the inlet angle. The profile is later modified according to the computed results of the total pressure gradient distribution. The rotor flow passage is then modeled using these assumed values. The flow field through the rotor 10 is computed based on the constructed flow passage at the design conditions, including a rotating speed of 492 revolutions per minute. The flow field is computed by numerically solving the governing equations:

$$\frac{1}{\sqrt{g}} \frac{\partial}{\partial t}(\sqrt{g}\,\rho) + \frac{\partial}{\partial x_j}(\rho W_j) = s_m$$

and, $$\frac{1}{\sqrt{g}} \frac{\partial}{\partial t}(\sqrt{g}\,\rho V_i) + \frac{\partial}{\partial x_i}(\rho W_j V_i - \tau_{ij}) = -\frac{\partial p}{\partial x_i} + s_i$$

where t is time, $x_i$ designates the coordinate direction (i=1,2,3 . . . ), $V_i$ is the absolute fluid velocity component in the direction $x_i$, $W_j$ is the relative velocity to the reference frame of the rotating rotor, p is piezometric pressure and $=p_s-\rho_o g_m x_m$, where $p_s$ is static pressure, $\rho_o$ is reference density, $g_m$ are gravitational field components, and $x_m$ are coordinates from the datum where $\rho_o$ is defined, ρ is air density, $\tau_{ij}$ is the stress tensor components, $s_m$ is mass source, $s_i$ are momentum source components, $\sqrt{g}$ is the determinant of the metric tensor, and repeated subscripts denote summation.

Based on the foregoing computed flow field, the incoming air flow angle at the vane inlet is obtained by:

$$\theta = \arctan\frac{W_\theta}{W_r}$$

where

θ is the air flow angle at the vane inlet, $W_\theta$ is the tangential component of relative air velocity at the rotor inlet, and $W_r$ is the radial component of relative air velocity at the rotor inlet.

This equation is computed on the relative reference frame of the rotating rotor 10. The relative tangential and radial velocity components directly result from the flow field computation. Additionally, the total pressure gradient $\partial P_o/\partial s$, along the flow passage through the rotor 10 is determined, where $P_o$ is the total pressure, and s is the vane profile direction. The total pressure is also a result of the flow field computation. The total pressure gradient is calculated along the vane profile and identifies flow loss. If the flow loss is significant at any point along the profile, that part of the profile is modified, and the modification is evaluated in the next iteration. The flow field computation provides the angle, velocity and profile. Based on these computations, the inlet vane angle is updated, with the inlet vane angle equated to the air flow inlet angle (α=θ). To evaluate the amount of air flow through the rotor 10, the flow rate is computed. The flow rate is a direct result of the passage design, and in this iterative procedure, the overall flow field parameter is used as the criteria for the termination computation detailed below. Based on the iteration's updated values for vane angle and vane profile, and based on the resulting relative air velocity $\vec{W}$, the volumetric flow rate through the air passages 24 of the rotor 10 is determined by the equation:

$$\theta = \arctan\frac{W_\theta}{W_r}$$

where

Q is the volumetric flow rate through the rotor passage, $\vec{W}$ is the relative velocity at the vane passage outlet, and $\vec{A}$ is the cross sectional area at the vane passage outlet.

The cross sectional area is calculated based on the iteration's vane profile and design parameters such as the number of vanes, the radius of the rotor, and the width of the air passage.

After determining the volumetric flow rate for the iteration, the procedure returns to repeat the flow field computation for the air flow passage through the rotor 10 based on the updated vane angle and vane profile. The flow field computation determines flow velocity, flow angle and total pressure. Based on the recomputed flow field, the incoming air flow angle is again obtained and the inlet vane angle is equated to that value. The total pressure gradient is again determined to modify the vane profile and minimize flow loss. Volumetric flow rate is then recalculated. This procedure is iterated until the volumetric flow rate Q, is maximized. The criteria for terminating the iteration process is that at the $i^{th}$ iteration:

$$\frac{Q_i - Q_{i-1}}{Q_i} \leq \delta$$

where δ is a specified small number that in the present embodiment of the rotor 10 is 0.01.

The cooling air flow rate for the rotor 10 is maximinzed through this procedure since the resistance to air flow passing through the rotor is minimized. Maximizing flow rate results in a maximized cooling performance for the rotor 10 because it enhances the heat transfer mechanism.

The calculated results for the present embodiment are shown in the following table.

| VEHICLE SPEED (MPH) | ROTOR AIR FLOW RATE (CFM) |
| --- | --- |
| 15 | 14.77 |
| 35 | 38.34 |
| 55 | 61.66 |
| 75 | 85.13 |
| 100 | 114.45 |

Figure 3:
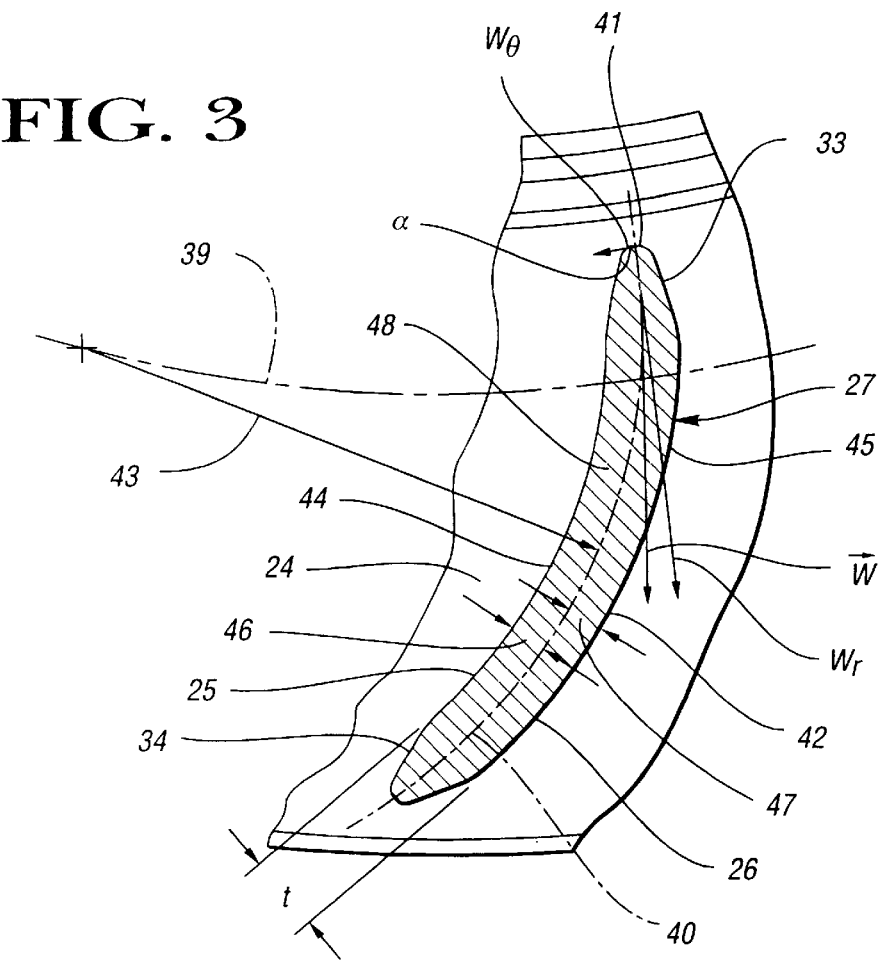
FIG. 3 is a detail fragmentary illustration of a vane of the rotor of FIG. 1.
Figure 4:
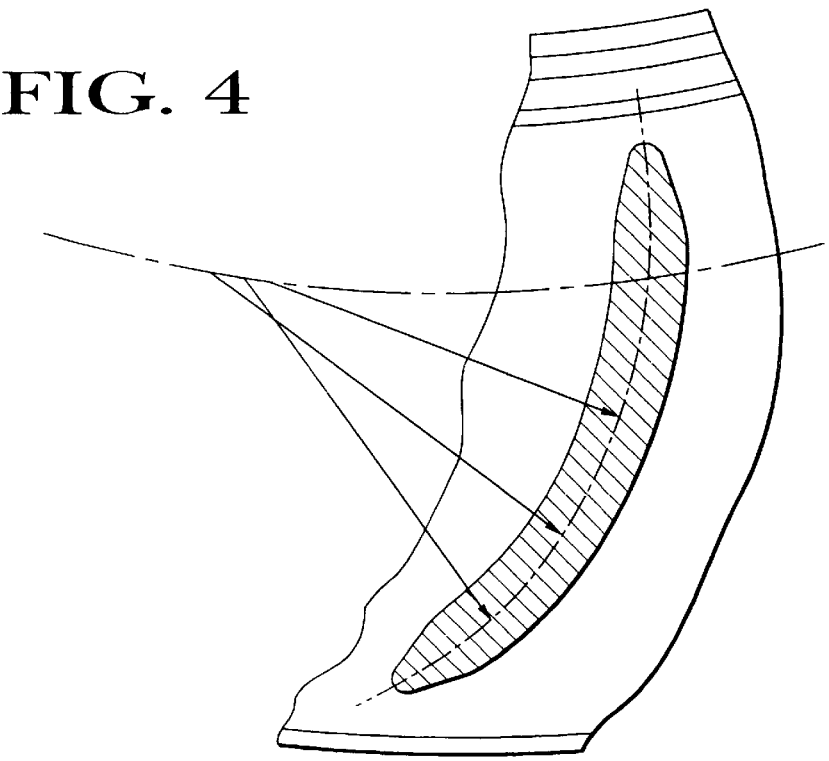
FIG. 4 is a detail fragmentary illustration of a vane according to another embodiment of the present invention.

Referring to FIG. 3, the developed profile 42 of vane 27 is illustrated. The vane 27 is defined about an curved line 40 that is oriented as an extension of the angle α at its inlet end 41. In the present embodiment, the curved line 40 is defined as an arc on a 51.5 millimeter radius 43 from the locus radius 39. The locus radius 39 is oriented 111.5 millimeters from the rotational axis 11 of the rotor 10. However, within the scope of the present invention, an arc is not the only form of curved line that will result from the flow field computation, and curved lines without a common center point may results as preferable in some applications, as shown in FIG. 4. The profile 42 of the vane 27 is defined from the reference plane of the vehicle that the rotor 10 is adapted for assembly into, and in a trace around the curved line 40. The profile of the vane body 48 between the tapered inlet end vane tip 33 and the tappered outlet end vane tip 34 is characterized by smoothly contoured surfaces 44 and 45 that define flow passages 24 with minimum flow restriction for the allotted flow area. Uniquely, the distance 46 between the curved line 40 and the surface 44 and the distance 47 between the curved line 40 and the surface 45 generally varies along the length of the body 48. The variance is a result of the flow field computational analysis that is carried out to minimize flow energy losses identified by changes in the total pressure gradient. Accordingly, the surfaces 44 and 45 are non-uniformly curved so that not all points along the surfaces 44 and 45 are defined from a common center point.

The air flow field for the rotor 10, that extends through the designed flow passages 24 between the set of curved vanes 27 and 28 results in a condition wherein cooling air enters the rotor 10 with a direction corresponding to a tangent of the vane curvature that results in minimized incidence flow disturbance at the passage inlet area. There is no abrupt flow resistance due to the vane profile dictated passage route. This avoids the creation of any flow blockages otherwise resulting from persistent velocity gradients that would subject the flow to intensive change. Accordingly, profile loss is minimized as the air flows through the flow passage 24.

I claim:

1. A ventilated brake rotor comprising:
   two spaced apart annular disks each having an inner diameter and an outer diameter with a locus radius defined radially between the inner diameter and the outer diameter;
   a series of vanes distributed around the rotor between the annular disks defining a series of flow passages between each adjacent pair of vanes, wherein the flow passages have an inlet area and an outlet, wherein each vane is defined about a curved line having a curvature that is defined from at least one point on the locus radius, wherein an incoming air flow angle is tangent to the curvature at the flow passage inlet area minimizing inlet incidence loss, and wherein a profile of each vane includes a streamlined portion near the inlet area, and adjacent the streamlined portion each vane includes a body portion that has a flow passage defining surface that generally varies in distance from the curved line so that a non-uniform curved surface is provided on the profile about the body portion that maximizes air flow rate through the flow passage;
   wherein the curvature at the flow passage inlet area results in an angle substantially equal to arctan $$\frac{W_\theta}{W_r},$$

where $W_\theta$ is a tangential component of relative air velocity at the flow passage inlet area, and $W_r$ is a radial component of relative air velocity at the flow passage inlet area.

2. A ventilated brake rotor according to claim 1 wherein the non-uniform curved surface of the vane body defies a maximized flow rate through the passages of $$\int \frac{1}{A} \vec{W} \cdot d\vec{A}$$

where $\vec{W}$ is an air velocity at the flow passage outlet relative to a reference frame of the rotor, and $\vec{A}$ is a cross sectional area at an outlet of the flow passages.

3. A ventilated brake rotor according to claim 2 wherein the series of vanes are provided in an alternating longer vane and shorter vane configuration so that air flows freely into the inlet area of the flow passages.

4. A ventilated brake rotor comprising:
   two spaced apart annular disks each having an inner diameter and an outer diameter with a locus radius defined radially between the inner diameter and the outer diameter, and a mid diameter defined between the inner diameter and the outer diameter;
   a series of longer vanes and a series of shorter vanes distributed around the rotor between the annular disks in an alternating longer vane—shorter vane configuration; the longer and shorter vanes defining a series of flow passages between each adjacent pair of vanes, wherein the flow passages have an inlet area near the inner diameter and an outlet area near the outer diameter, wherein each vane of the series of longer and shorter vanes is defined about a curved line having a curvature that is defined from at least one point on the locus radius, wherein an incoming air flow angle at the flow Passage inlet area is tangent to the curvature minimizing inlet incidence loss, and wherein a profile of each vane includes a streamlined portion near the inlet area and near the outlet area, and between the streamlined portions each vane includes a body portion that has a flow passage defining surface that generally varies in distance from the curved line so that a non-uniform curved surface is provided by the flow passage defining surface on the profile about the body portion that maximizes air flow rate through the flow passage;

wherein the curvature at the flow passage inlet area results in an angle substantially equal to arctan $$\frac{W_\theta}{W_r},$$

where $W_\theta$ is a tangential component of relative air velocity at the flow passage inlet area, and $W_r$ is a radial component of relative air velocity at the flow passage inlet area.

5. A ventilated brake rotor according to claim 4 wherein the non-uniform curved surface defines a maximized flow rate through the passages of $$\int_A \vec{W} \cdot d\vec{A}$$

where $\vec{W}$ is an air velocity at the outlet relative to a reference frame of the rotating rotor, and $\vec{A}$ is a cross sectional area at an outlet of the flow passages.

6. A ventilated brake rotor comprising:

two spaced apart annular disks each having an inner diameter and an outer diameter with a locus radius defined radially between the inner diameter and the outer diameter, and a mid diameter defined between the inner diameter and the outer diameter;

a series of longer vanes and a series of shorter vanes distributed around the rotor between the annular disks in an alternating longer vane—shorter vane configuration, the longer and shorter vanes defining a series of flow passages between each adjacent pair of vanes, wherein the flow passages have an inlet area near the inner diameter and an outlet area near the outer diameter, wherein each vane of the series of longer and shorter vanes is defined about a curved line having a curvature that is defined from at least one point on the locus radius, wherein an incoming air flow angle at the flow passage inlet area is tangent to the curvature minimizing inlet incidence loss, and wherein a profile of each vane includes a streamlined portion near the inlet area and near the outlet area, and between the streamlined portions each vane includes a body portion that has a flow passage defining surface that generally varies in distance from the curved line so that a non-uniform curved surface is provided by the flow passage defining surface on the profile about the body portion that maximizes air flow rate through the flow passage;

wherein the non-uniform curved surface provided on the profile about the body portion is a result of a process that forms the profile including the steps of:

(a). determining the curvature by setting an angle defined by the curvature at the flow passage inlet area equal to arctan $$\frac{W_\theta}{W_r},$$

where $W_\theta$ is a tangential component of relative air velocity at the flow passage inlet area, and $W_r$ is a radial component of relative air velocity at the flow passage inlet area, (b). identifying total pressure gradient changes in the flow passages by determining $\partial P_o/\partial s$ where $P_o$ is the total air pressure, and s is the vane profile direction, (c). modifying the profile at any undesirable total pressure gradient changes identified in step (b), (d). determining a volumetric flow rate through the flow passages by determining $$\int_A \vec{W} \cdot d\vec{A}$$

where $\vec{W}$ is an air velocity at the outlet area relative to a reference frame of the rotor, and $\vec{A}$ is a cross sectional area at an outlet of the flow passages, and (e). repeating steps (a), (b), (c), and (d), until the volumetric flow rate is maximized.

7. A ventilated brake rotor according to claim 6 wherein the curvature is uniformly defined as an arc from a single point on the locus radius.

8. A ventilated brake rotor according to claim 6 wherein the curvature is non-uniform and is defied from a plurality of points on the locus radius.

* * * * *